United States Patent
Yang et al.

(10) Patent No.: US 10,178,679 B2
(45) Date of Patent: Jan. 8, 2019

(54) SIGNALING DESIGNS FOR NETWORK ASSISTED INTERFERENCE CANCELLATION AND SUPPRESSION

(71) Applicant: WSOU Investments, LLC, Los Angeles, CA (US)

(72) Inventors: Weidong Yang, San Diego, CA (US); Xiaoyi Wang, Beijing (CN); Jun Tan, Lake Zurich, IL (US)

(73) Assignee: WSOU Investments, LLC, Los Angeles, CA (US)

( * ) Notice: Subject to any disclaimer, the term of this patent is extended or adjusted under 35 U.S.C. 154(b) by 0 days.

(21) Appl. No.: 15/022,555

(22) PCT Filed: Sep. 29, 2014

(86) PCT No.: PCT/EP2014/070759
§ 371 (c)(1),
(2) Date: Mar. 16, 2016

(87) PCT Pub. No.: WO2015/044408
PCT Pub. Date: Apr. 2, 2015

(65) Prior Publication Data
US 2016/0234853 A1    Aug. 11, 2016

Related U.S. Application Data

(60) Provisional application No. 61/883,856, filed on Sep. 27, 2013.

(51) Int. Cl.
*H04W 72/08* (2009.01)
*H04B 1/7097* (2011.01)
(Continued)

(52) U.S. Cl.
CPC ........ *H04W 72/082* (2013.01); *H04B 1/7097* (2013.01); *H04J 11/0023* (2013.01); *H04W 72/042* (2013.01); *H04W 72/1278* (2013.01)

(58) Field of Classification Search
None
See application file for complete search history.

(56) References Cited

U.S. PATENT DOCUMENTS

2012/0155411 A1* 6/2012 Ancora ............... H04J 11/0056
370/329
2012/0201162 A1* 8/2012 Kim .................... H04B 17/345
370/252

FOREIGN PATENT DOCUMENTS

| EP | 2675212 | 12/2013 |
|---|---|---|
| WO | 2010108136 | 9/2010 |
| WO | 2011052869 | 5/2011 |

OTHER PUBLICATIONS

International Search Report and Written Opinion received for corresponding Patent Cooperation Treaty Application No. PCT/EP2014/070759, dated Dec. 2, 2014, 11 pages.

* cited by examiner

*Primary Examiner* — Anh Ngoc Nguyen
(74) *Attorney, Agent, or Firm* — Sean D. Burdick

(57) ABSTRACT

Signaling Designs for Network Assisted Interference Cancellation and Suppression Signaling can be valuable in connection with addressing issues of interference. Signaling designs may be valuable, for example, in network-assisted interference cancellation and suppression. A method can include determining transmission information for at least one interference source for a user equipment of a base station. The method can also include signaling the user equipment about the transmission information for the at least one interference source. The transmission information can be configured to facilitate a receiver of the user equipment to cancel interference from the at least one interference source.

14 Claims, 8 Drawing Sheets

(51) Int. Cl.
*H04J 11/00* (2006.01)
*H04W 72/12* (2009.01)
*H04W 72/04* (2009.01)

SIGNALING DESIGNS FOR NETWORK ASSISTED INTERFERENCE CANCELLATION AND SUPPRESSION

RELATED APPLICATION

This application was originally filed as PCT Application No. PCT/EP2014/070759 filed Sep. 29, 2014, which claims priority benefit from U.S. Provisional Application No. 61/883,856, filed Sep. 27, 2013.

BACKGROUND

Field

Signaling can be valuable in connection with addressing issues of interference. Signaling designs may be valuable, for example, in network-assisted interference cancellation and suppression.

Description of the Related Art

Network assisted interference cancellation and suppression (NAICS) is a study item for release 12 (Rel-12) of the third generation partnership project (3GPP).

NAICS may be related to a variety of receiver types. For example, NAICS may be related to interference rejection type receivers which include LMMSE-IRC (Linear MMSE-IRC), E-LMMSE-IRC (Enhanced Linear MMSE-IRC), and W-LMMSE-IRC (Widely Linear MMSE-IRC). For another example, NAICS may also be related to maximum likelihood type receivers which include ML (Maximum likelihood receiver), R-ML (Reduced complexity maximum likelihood receiver), and Iterative (R)-ML (Iterative maximum likelihood receiver or Iterative reduced complexity maximum likelihood receiver). For further example, NAICS may also be related to interference cancellation type receivers which include L-CWIC (Linear Codeword interference cancellation receiver), ML-CWIC (Maximum likelihood Codeword interference cancellation receiver), and SLIC (Symbol level interference cancellation type receiver).

Techniques developed under NAICS target interference suppression and interference cancellation (ISIC) at a user equipment (UE). They can be treated as an integral part of the whole portfolio of interference mitigation and interference cancellation/suppression (IMIC) in a communication system.

Conventional ways of facilitating UE performance of interference cancellation assume perfect physical downlink shared channel (PDSCH) allocation alignment between interference and desired PDSCH signal. These approaches have a common characteristic: the UE does not know the resource allocation information for the interference PDSCH. The interference PDSCH to the allocated bandwidth might be for different users, therefore the transmission power and pre-coding matrix indicator (PMI) of that PDSCH might be different. Plus some physical resource block (PRB) might be empty, which means no interference there. The interference cancellation performance will be much degraded without the resource allocation information for interference PDSCH.

However, how to indicate the resource allocation information for interference may require many bits to indicate resource allocation. Therefore it is not conventionally possible to put such information in the downlink control information (DCI) format. Also, the resource allocation of interference is dynamically changed every transmission time interval (TTI), so a radio resource control (RRC) configuration based solution is not fast enough.

Moreover, as mentioned above, conventional approaches consider interference cancellation with aligned PDSCH assignments only, which constrains evolved Node B (eNB) schedulers and may consume the gain from NAICS with the loss due to restricted scheduling.

In another conventional approach, radio network temporary identity (RNTI) space is divided up into groups, and a UE is required to search Das masked by RNTIs in each group, 8 or 16 RNTIs. As a result, the UE needs to perform many more additional blind decodings on the RNTIs in the group.

SUMMARY

According to a first embodiment, a method can include determining transmission information for at least one interference source for a user equipment of a base station. The method can also include signaling the user equipment about the transmission information for the at least one interference source. The transmission information is configured to facilitate a receiver of the user equipment to cancel interference from the at least one interference source.

In a variant, the signaling can include masking downlink control information with an interference radio network temporary identity.

In a variant, the signaling can include masking each of a plurality of downlink control information with a corresponding interference radio network temporary identity.

In a variant, the determining can include receiving the transmission information from at least one other base station, wherein the at least one interference source can include the at least one other base station.

In a variant, the signaling can include signaling an interference radio network temporary identity, wherein the interference radio network temporary identity is uniquely associated with a cell.

In a variant, the signaling can include signaling a plurality of interference radio network temporary identities, wherein each interference radio network temporary identity of the plurality of interference radio network temporary identities is uniquely associated with a corresponding cell.

In a variant, the signaling can include signaling to a user equipment of a pico cell regarding resource assignment of a macro cell.

In a variant, the signaling can include a code state. The code state can be configured to indicate that corresponding scheduling information is about an interference transmission rather than about the base station.

In a variant, the code state can include a PDSCH RE mapping and Quasi-Collocation Indicator status.

In a variant, the method includes dynamic information being routed from an interference cell or directly broadcasted from the interference cell to a victim user equipment.

According to a second embodiment, a method can include receiving transmission information for at least one interference source for a user equipment of a base station. The method can also include canceling, at the user equipment, interference from the at least one interference source based on the received transmission information.

In a variant, the method can include determining the transmission information from downlink control information masked with an interference radio network temporary identity.

In a variant, the method can include determining that the downlink control information belongs to a specific cell based on at least one of a user equipment identification range or an offset corresponding to a location of the downlink control information.

In a variant, the method can include decoding a transmission intended for a second user equipment and canceling interference from the received signal, wherein the canceling is configured to reveal a signal intended for the user equipment.

In a variant, the method can include monitoring a search space of a macro cell according to an interference radio network temporary identity and a search space of a pico cell according to a cell radio network temporary identity of the base station.

In a variant, the method can include receiving a code state with the transmission information, and interpreting corresponding scheduling information as being about an interference transmission rather than about the base station, based on the code state.

In a variant, the code state can include a PDSCH RE mapping and Quasi-Collocation Indicator status.

In a variant, the method includes preconfiguring the user equipment with semi-static information.

In a variant, the method further includes receiving dynamic information routed from an interference cell or directly broadcasted from the interference cell and using the dynamic information together with the semi-static information to cancel the interference at the user equipment.

In a third embodiment, an apparatus can include means for determining transmission information for at least one interference source for a user equipment of a base station. The apparatus can also include means for signaling the user equipment about the transmission information for the at least one interference source. The transmission information is configured to facilitate a receiver of the user equipment to cancel interference from the at least one interference source.

In a variant the signaling can include masking downlink control information with an interference radio network temporary identity.

In a variant, the signaling can include masking each of a plurality of downlink control information with a corresponding interference radio network temporary identity.

In a variant, the determining can include receiving the transmission information from at least one other base station. The at least one interference source can include the at least one other base station.

In a variant, the signaling can include signaling an interference radio network temporary identity. The interference radio network temporary identity can be uniquely associated with a cell.

In a variant, the signaling can include signaling a plurality of interference radio network temporary identities. Each interference radio network temporary identity of the plurality of interference radio network temporary identities can be uniquely associated with a corresponding cell.

In a variant, the signaling can include signaling to a user equipment of a pico cell regarding resource assignment of a macro cell.

In a variant, the signaling can include a code state. The code state can be configured to indicate that corresponding scheduling information is about an interference transmission rather than about the base station.

In a variant, the code state can include a PDSCH RE mapping and Quasi-Collocation Indicator status.

In a variant, dynamic information can be routed from an interference cell or directly broadcasted from the interference cell to a victim user equipment.

According to a fourth embodiment, an apparatus can include means for receiving transmission information for at least one interference source for a user equipment of a base station. The apparatus can also include means for canceling, at the user equipment, interference from the at least one interference source based on the received transmission information.

In a variant, the apparatus can further include means for determining the transmission information from downlink control information masked with an interference radio network temporary identity.

In a variant, the apparatus can further include means for determining that the downlink control information belongs to a specific cell based on at least one of a user equipment identification range or an offset corresponding to a location of the downlink control information.

In a variant, the apparatus can further include means for decoding a transmission intended for a second user equipment and canceling interference from the received signal, wherein the canceling is configured to reveal a signal intended for the user equipment.

In a variant, the apparatus can further include means for monitoring a search space of a macro cell according to an interference radio network temporary identity and a search space of a pico cell according to a cell radio network temporary identity of the base station.

In a variant, the apparatus can further include means for receiving a code state with the transmission information. The apparatus can additionally include means for interpreting corresponding scheduling information as being about an interference transmission rather than about the base station, based on the code state.

In a variant, the code state can include a PDSCH RE mapping and Quasi-Collocation Indicator status.

In a variant, the apparatus can further include means for preconfiguring the user equipment with semi-static information.

In a variant, the apparatus can further include means for receiving dynamic information routed from an interference cell or directly broadcasted from the interference cell. The apparatus can additionally include means for using the dynamic information together with the semi-static information to cancel the interference at the user equipment.

According to a fifth embodiment, an apparatus can include at least one processor and at least one memory including computer program code. The at least one memory and the computer program code can be configured to, with the at least one processor, cause the apparatus at least to determine transmission information for at least one interference source for a user equipment of a base station. The at least one memory and the computer program code can also be configured to, with the at least one processor, cause the apparatus at least to signal the user equipment about the transmission information for the at least one interference source. The transmission information can be configured to facilitate a receiver of the user equipment to cancel interference from the at least one interference source.

In a variant, the at least one memory and the computer program code can be configured to, with the at least one processor, cause the apparatus at least to signal the user equipment about the transmission information including masking downlink control information with an interference radio network temporary identity.

In a variant, the at least one memory and the computer program code can be configured to, with the at least one processor, cause the apparatus at least to signal the user equipment about the transmission information including masking each of a plurality of downlink control information with a corresponding interference radio network temporary identity.

In a variant, the at least one memory and the computer program code can be configured to, with the at least one processor, cause the apparatus at least to determine the transmission information including receiving the transmission information from at least one other base station. The at least one interference source can include the at least one other base station.

In a variant, the at least one memory and the computer program code can be configured to, with the at least one processor, cause the apparatus at least to signal the user equipment about the transmission information including signaling an interference radio network temporary identity. The interference radio network temporary identity can be uniquely associated with a cell.

In a variant, the at least one memory and the computer program code can be configured to, with the at least one processor, cause the apparatus at least to signal the user equipment about the transmission information including signaling a plurality of interference radio network temporary identities. Each interference radio network temporary identity of the plurality of interference radio network temporary identities can be uniquely associated with a corresponding cell.

In a variant, the at least one memory and the computer program code can be configured to, with the at least one processor, cause the apparatus at least to signal the user equipment about the transmission information including signaling to a user equipment of a pico cell regarding resource assignment of a macro cell.

In a variant, the at least one memory and the computer program code can be configured to, with the at least one processor, cause the apparatus at least to signal the user equipment about the transmission information including signaling a code state. The code state can be configured to indicate that corresponding scheduling information is about an interference transmission rather than about the base station.

In a variant, the code state can include a PDSCH RE mapping and Quasi-Collocation Indicator status.

In a variant, the dynamic information can be routed from an interference cell or directly broadcasted from the interference cell to a victim user equipment.

According to a sixth embodiment, an apparatus can include at least one processor and at least one memory including computer program code. The at least one memory and the computer program code can be configured to, with the at least one processor, cause the apparatus at least to receive transmission information for at least one interference source for a user equipment of a base station. The at least one memory and the computer program code can be configured to, with the at least one processor, cause the apparatus at least to cancel, at the user equipment, interference from the at least one interference source based on the received transmission information.

In a variant, the at least one memory and the computer program code can be configured to, with the at least one processor, cause the apparatus at least to determine the transmission information from downlink control information masked with an interference radio network temporary identity.

In a variant, the at least one memory and the computer program code can be configured to, with the at least one processor, cause the apparatus at least to determine that the downlink control information belongs to a specific cell based on at least one of a user equipment identification range or an offset corresponding to a location of the downlink control information.

In a variant, the at least one memory and the computer program code can be configured to, with the at least one processor, cause the apparatus at least to decode a transmission intended for a second user equipment and canceling interference from the received signal, wherein the canceling is configured to reveal a signal intended for the user equipment.

In a variant, the at least one memory and the computer program code can be configured to, with the at least one processor, cause the apparatus at least to monitor a search space of a macro cell according to an interference radio network temporary identity and a search space of a pico cell according to a cell radio network temporary identity of the base station.

In a variant, the at least one memory and the computer program code can be configured to, with the at least one processor, cause the apparatus at least to receive a code state with the transmission information. The at least one memory and the computer program code can also be configured to, with the at least one processor, cause the apparatus at least to interpret corresponding scheduling information as being about an interference transmission rather than about the base station, based on the code state.

In a variant, the code state can include a PDSCH RE mapping and Quasi-Collocation Indicator status.

In a variant, the at least one memory and the computer program code can be configured to, with the at least one processor, cause the apparatus at least to preconfigure the user equipment with semi-static information.

In a variant, the at least one memory and the computer program code can be configured to, with the at least one processor, cause the apparatus at least to receive dynamic information routed from an interference cell or directly broadcasted from the interference cell. In a variant, the at least one memory and the computer program code can also be configured to, with the at least one processor, cause the apparatus at least to use the dynamic information together with the semi-static information to cancel the interference at the user equipment.

According to seventh and eighth embodiments, a non-transitory computer-readable medium can be encoded with instructions that, when executed in hardware, perform a process. The process can include the method according to the first or second embodiment, in any of their respective variants.

According to ninth and tenth embodiments, a computer program product can encode instructions for performing a process. The process can include the method according to the first or second embodiment, in any of their respective variants.

According to an eleventh embodiment, a system can include a first apparatus according to the third or fifth embodiment and a second apparatus according to the fourth or sixth embodiment. The first apparatus and second apparatus can be configured to communicate with one another.

In the above embodiments and their variants, the transmission information can be resource assignment information.

BRIEF DESCRIPTION OF THE DRAWINGS

For proper understanding of the invention, reference should be made to the accompanying drawings, wherein.

DETAILED DESCRIPTION

Figure 1:
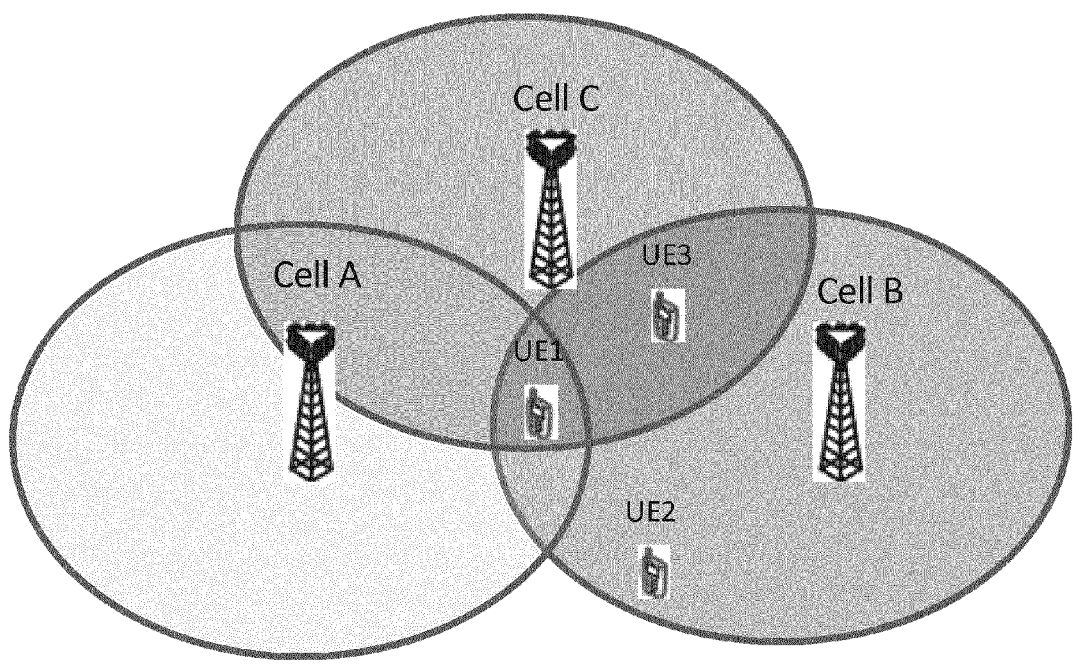
FIG. 1 illustrates an example of network layout.

In the following, the "victim cell" can be the serving cell of the UE of interest. Moreover, the UE of interest can also be referred to as the "victim UE." The "interference cell" can be the cell transmitting signal(s) which interferes with the UE of interest. The term "interference UE" can refer to a UE being served by an interference cell.

Among all the receivers considered in NAICS, ML, R-ML, iterative(R)-ML, L-CWIC and ML-CWIC may require information concerning the interference to demodulate and decode the interference signal. For example, such receivers may require information concerning the interference that does not change from TTI to TTI. An exception may be TM 7 URS scrambling, as its seeding uses the currently scheduled UE's C-RNTI, which can change depending on which UE is being scheduled. The relatively unchanging information may include carrier frequency of the interference cell and information needed to derive rate matching, such as the number of CRS ports, the configuration of CSI-RS (only for TM9/10), the configuration of muting pattern (only for TM9/10), the configuration of IM-RS (only for TM10), and the configuration of MBSFN subframes. The relatively unchanging information can also include time-frequency synchronization (quasi-collocation assumption), CP (Cyclic Prefix) length, and demodulation reference signal scrambling, which can include the following: for TM 1/2/3/4/5/6, cell-ID and slot number; for TM 8/9, cell-ID and scrambling bit, and slot number item; for TM 10, (virtual) cell ID and slot number; and for TM 7, cell-ID, UE-ID (C-RNTI) and slot number. The relatively unchanging information can further include configuration of EPDCCH.

The receivers may also need information regarding interference, which information can change from TTI to TTI. This relatively changing information may include transmission mode, rank of transmission, MCS level of transmission, PMI (Precoding Matrix Index) for TM 4/5/6 (not needed for TM 7/8/9/10), and resource allocation of transmission, such as distributed or localized, PRBs used in the transmission, and the like. Further when modulation scheme such as QAM256 is introduced in LTE-A, assuming the same number of bits is used to signal MCS levels, a further information to specify one among the MCS tables (for example one table for the existing definition, another table including QAM256) may be included in the relatively changing information. The relatively changing information can also include the starting symbol of PDSCH transmission, and PDSCH scrambling information, such as (virtual) cell-ID, UE-ID (RNTI), and slot number. Furthermore, the relatively changing information can further include the reference signal to PDSCH RE ratios, which may include $P_A$ and $P_B$ for CRS based transmission modes TM 1/2/3/4/5/6.

In the case that the interference cell and victim cell are the same (in intracell MU-MIMO, the victim UE sees interference from transmission intended for another UE also served by the victim cell), much of the relatively unchanging information may be known at victim UE. The victim UE, however, may need additional signaling to derive the relatively changing information, for example in intracell MU-MIMO transmission. In the case that the interference cell and victim cell are different, then the victim UE may need to be furnished with both the relatively changing and the relatively unchanging information.

Certain embodiments provide for dynamically signaling assistance information of resource allocation in interfering neighboring cells to a UE to allow the UE to perform interference cancellation of such transmission for transmission from the UE's own serving cell, if supported by the UE receiver.

Three example embodiments are provided as non-limiting illustrations. In each of these three embodiments, some semi-static information about the interference cell can be routed to the victim cell, and the victim cell can inform the victim UE of that information through RRC signaling. The semi-static information from interference cell may include the relatively unchanging information and at least some of the relatively changing information. For example, through network coordination the starting symbol of PDSCH at the interference cell can be fixed and included in the semi-static information routed from the interference cell to the victim cell. The scrambling sequence for interference PDSCH can be generated with the scrambling seed from the (virtual) cell ID and the C-RNTI of the interference UE. Example embodiments provide ways to signal the C-RNTI of the interference UE. Alternatively, the scrambling seed for interference PDSCH can be also generated with scrambling seed from the (virtual) cell ID and a fixed value, and the virtual cell ID and fixed value can be included in the semi-static information. Even from one interference cell, multiple sets which contain different semi-static information can be routed to the victim cell. The victim cell can receive such semi-static information from multiple interference cells.

Embodiment one can be applied to NAICS in general, which assumes the scheduling information on interference cell is routed to the victim cell. This may utilize an ideal backhaul between two cells. In the case two or more UEs under the same cell suffer from one another's PDSCH transmission, the interference cell and the victim cell are the same. Further it is also possible a UE suffers from PDSCH transmission for another UE in the same cell (in a intracell MU-MIMO setup) and at the same time also suffers from PDSCH transmission(s) for UEs in other cells (in an intracell and intercell MU-MIMO setup). For those cases, the example embodiment is still applicable with the understanding that one "interference cell" can be the same as the "victim cell" from a UE's point of view.

Embodiment two can be used in a heterogeneous network (HetNet) scenario. For example, a Pico UE can receive intf-RNTI masked DCIs transmitted from Macro cell directly to get information about the interference. Because the Macro Tx power may be the dominating power in this area, the received power from the Macro may be good enough for the UE's purposes, especially for range extended UEs. One scenario is for non-ideal backhaul between macro and pico. The semi-static information about the macro can be sent by a pico base station to a pico UE along with the configuration of intf-RNTI and necessary information to monitor the downlink control channel of the macro. In general, if the downlink control channels from the macro and the pico do not interfere with each other as may be the case when the macro's EPDCCH and pico's EPDCCH use non-overlapping PRBs, the victim UE can monitor macro and pico's downlink control channels simultaneously. In another case, in which the macro uses EPDCCH starting from OFDM symbol 4, and the pico uses PDCCH, the UE can also monitor both simultaneously. In another example in which the macro uses PDCCH, and the pico uses EPDCCH starting from OFDM symbol 4, the UE can also monitor both simultaneously. As an example, assume the macro and the pico use EPDCCHs on non-overlapping PRBs, then the pico UE can monitor the EPDCCH of the macro and at the same time the pico UE can monitor its own EPDCCH, which can give the UE an indication whether any NAICS operation is needed in that TTI. Then there may be no need for the macro to constantly communicate with the pico to announce the macro's TTI level scheduling decision. Moreover, such information may anyway be too late to be useful at the victim UE, when the backhaul between macro and pico is non-ideal. In the subframes where EPDCCH is used to serve the victim UE, the victim UE can be configured to monitor the macro's EPDCCH in one set, and the pico's EPDCCH in another set. Thus, the blind decoding number of Das may not be increased. The Victim UE can also be configured with an additional set for EPDCCH in the macro, in addition to its own EPDCCH sets.

Embodiment three can use a field or code state in the downlink control information (DCI), such as PDSCH RE mapping and Quasi-Collocation Indicator (PQI) or PUCCH power control bits (TPC), to signal the interference information, the DCI carrying interference information can be masked by the UE's own UE-ID (C-RNTI for example). Thus the UE can decode the interference DCI at its own search space.

Thus, in general certain embodiments provide a way to dynamically signal a UE about the resource assignment information for interference sources to facilitate a UE's receiver to cancel interference. At least three embodiments are possible, as mentioned above and explained in more detail below.

According to embodiment one, an eNB can configure one or more intf-RNTIs to a certain user. The intf-RNTI can be used to scramble the DCI indicating the resource allocation information of interference PDSCH. The UE can also monitor the configured intf-RNTI(s) and derive the resource allocation information inside as interference information. The resource allocation can be part of the dynamic information routed from the interference cell to the victim cell for every TTI. The size of DCI here can be equal to that of an existing DCI such as DCI 1/1A/1B/1C/1D/2/2A/2B/2C/2D, depending on the configured TM of the victim UE and interference UEs, which can avoid additional blind decoding.

Some fields in the existing DCI formats masked by intf-RNTI, for example TPC, HARQ process ID and NDI, may not carry any useful information from the victim UE's point of view. Thus, such fields can be re-purposed to take different meanings: in a first example the TPC bits can be used to indicate to the victim UE that the UE needs to assume one out of multiple sets of semi-static information of interference cells. In a second example, the TPC bits can be used to indicate to the victim UE that it needs to assume some dynamic information. For example, the UE can be provided with four interference UEs' C-RNTI's, and TPC"00" can point to the first interference UE's C-RNTI, TPC="01" can point to the second interference UE's C-RNTI), and so on. In a third example, the TPC bits can be used to indicate to the victim UE to assume one set of semi-static information and dynamic information. For example, TPC="00" can mean selecting first semi-static information from interference cell 1 and the first interference UE's C-RNTI under interference cell 1, TPC="11" can mean selecting first semi-static information from interference cell 2 and the second interference UE's C-RNTI under interference cell 2, and so on.

Some fields in the existing DCI formats masked by intf-RNTI such as DAI or "SRS request" which exists in TDD only can be set to fixed values as they do not carry useful information and re-purposing them for TDD only would create fragmented specification.

It is also possible to use intf-RNTI to mask a new DCI format specifically defined for NAICS operation. The new DCI format can then include the resource allocation and resource allocation type that specifies type 0, type 1, and type 2, distributed versus localized VRBs (so interference transmission at different transmission modes can be signaled to the victim UE), MCS level, carrier indicator, TPMI/PMI for TM6/TM4, and HARQ revision for each transport block so information needed to decode the interference signal at the victim UE is provided. When an R-ML type NAICS receiver is targeted, then MCS level can be replaced by modulation order in the new DCI format. The new DCI format can also include information about the transmission mode and optionally PMI and the Reference signal to PDSCH RE ratios ($P_A$ and $P_B$) for CRS based transmission modes TM 1/2/3/4/5/6. In this way, the same DCI format masked by intf-RNTI can be used for interference UEs at different transmission modes.

While the victim UE and interference UEs may be configured with the same transmission mode, it is also possible the victim UE and interference UEs may be configured with different transmission modes. As a consequence, the DCI formats masked with its own C-RNTI searched by the victim UE may be different from the DCI formats masked with intf-RNTI. One intf-RNTI can be shared by multiple UEs, and each intf-RNTI can be associated with a cell id of the interference cell. Such sharing and association can help a UE to assume the sequence of reference signals (RS) associated with that interference PDSCH. As mentioned above, if some field, such as TPC, inside the intf-RNTI masked DCI can be re-purposed to select the semi-static and dynamic information. In such a case, only one intf-RNTI may be configured for the victim UE and the number of blind coding for DCIs is reduced.

The transmission of interference DCIs (DCIs masked by intf-RNTI) can be opportunistic. In other words, the eNB can avoid transmitting the interference DCI if the load of PDCCH/EPDCCH is too high. In that case, the UE can do blind decoding or can follow the previous resource allocation information for the interference.

According to embodiment two, a UE can be configured to monitor the PDCCH/EPDCCH from other cells. The EPDCCH The interference cell can broadcast EPDCCH with intf-RNTI to inform surrounding cells' UEs its dynamic scheduling information. This can be particularly useful for the scenario where a major interference cell has much higher transmitter power than neighbor cells. A single intf-RNTI scrambled DCI can be received by multiple users from different cells.

According to embodiment three, DCI(s) masked by the victim UE's C-RNTI can be used to convey the interference resource allocation information. To indicate the information contained in the DCI is not for PDSCH transmission intended for the victim UE rather it is about interference, one or multiple states from PQI in DCI format-2D can be used to indicate current DCI is for an interference cell. The configuration of PQI can state an interference cell ID, so UE can know which cell is the source of the interference. Upon receiving the DCI with that PQI state, the UE can assume that the DCI is about resource allocation of an interference cell instead of resource allocation for itself. Additionally one field can be introduced in the DCI formats to differentiate between intended PDSCH transmission and interference. For example, if there is a "0" in the new field, the victim UE knows the DCI is for a PDSCH transmission intended for itself; if there is a "1" in the new field, the victim UE knows the DCI is for an interference PDSCH. In this case, fields in the DCI formats such as TPC and PQI can take new meanings as explained embodiment one to choose the semi-static information and dynamic information.

FIG. 1 illustrates an example of network layout. In FIG. 1, the network layout is shown with UE 1 attached to cell A, UE 2 attached to cell B, and UE 3 attached to cell C. As shown, UE 2 may have very little interference from non-serving cells, UE 3 may have a moderate amount of interference from a non-serving cell, and UE1 may have the highest level of interference from non-serving cells.

Figure 2:
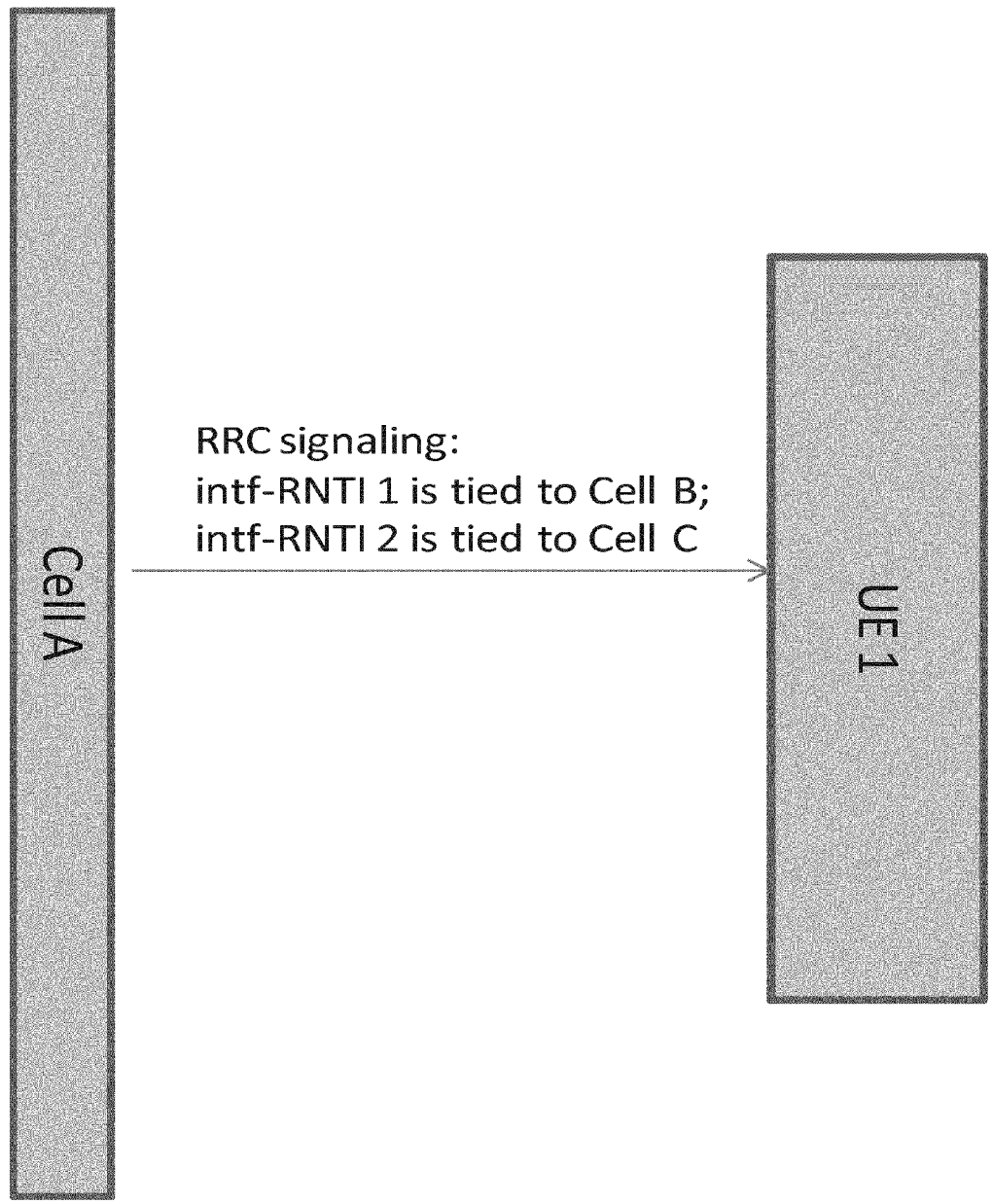
FIG. 2 illustrates set up of intf-RNTI through RRC signaling, according to certain embodiments.

FIG. 2 illustrates set up of intf-RNTI through RRC signaling, according to certain embodiments. As shown in FIG. 2, cell A can communicate with UE 1 using RRC signaling. This signaling can indicate that intf-RNTI 1 is tied to Cell B and that intf-RNTI 2 is tied to Cell C. Semi-static information about Cell B can be tied to intf-RNTI 1, and there can be multiple sets of semi-static information about Cell B tied to intf-RNTI 1. Similar associations between cells and intf-RNTIs can be provided by Cells B and C respectively to UEs 2 and 3. Depending on the UE's location, for example at the boundary of Cell A and Cell B or at the boundary of cell A or Cell C (as shown in FIG. 1), the needed semi-static information signaled to a UE may be different. The semi-static information from Cell B and Cell C can be routed to Cell A through X2 or configured through operations administration and maintenance (OAM). Alternatively the semi-static information from all cells such as Cell B and Cell C can be collected at a central network node and then proactively distributed to cells. Cells can then choose and signal the relevant part to UEs. For example, the cell may choose based on only semi-static information about Cell B and Cell C being relevant to UE 1 for information about interference, but not other cells' semi-static information). The central network node can also be provided with victim UE's CSI information or mobility management information such as RSRP/RSRQ by the victim cell. The central network node can then reactively choose the relevant semi-static information for the victim UE. Further the victim UE's CSI information can include the CSI measurements on multiple CSI processes configured to monitor different cells (for example Cell A, Cell B and Cell C). Some of the CSI processes can be configured to report CSI at different muting or blanking hypotheses at one or more cells. In this way, the network can be free to choose using muting/blanking and/or NAICS to improve UE's link quality and/or throughput. Each cell can function as a "central network node," when it has access to the same information which would be available at a "central network node."

Figure 3:
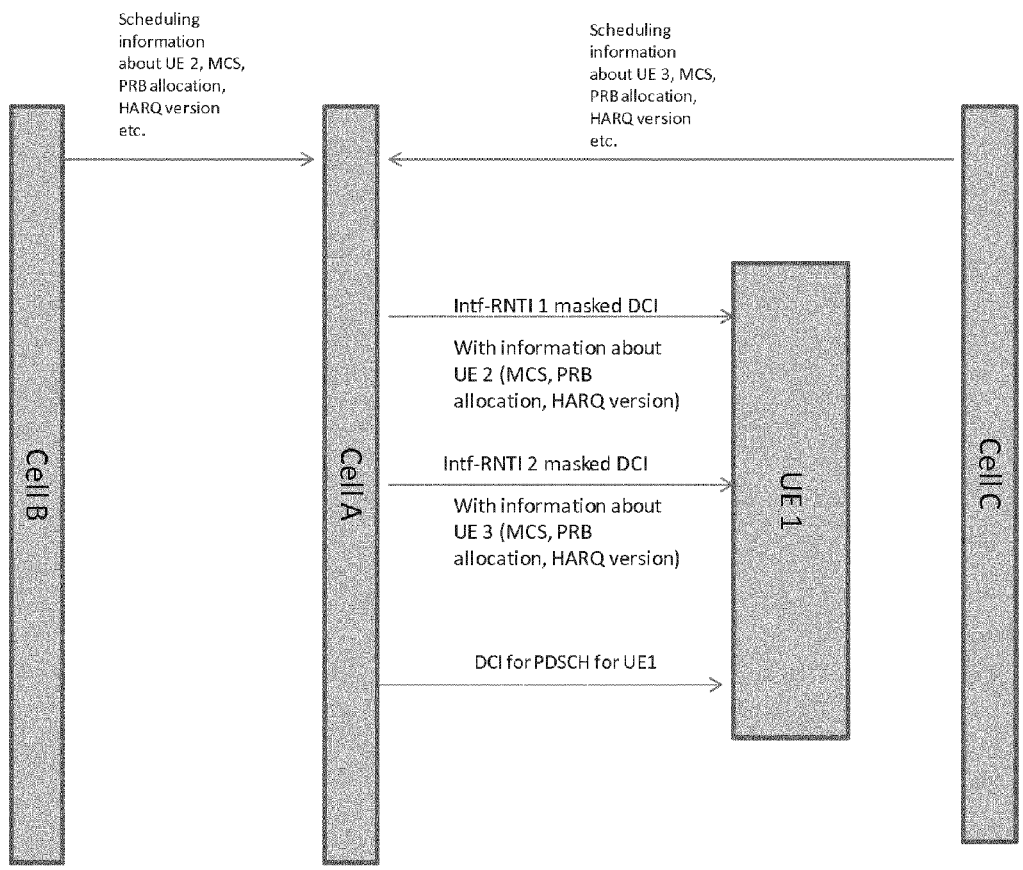
FIG. 3 illustrates a signaling flow according to embodiment one.

FIG. 3 illustrates a signaling flow according to embodiment one. As shown in FIG. 3, Cells B and C can each provide scheduling information about their respective UEs to the other cells, such as Cell A dynamically. The scheduling information can also include information like modulation and coding scheme (MCS), PRB allocation, hybrid automatic repeat request (HARQ) version, and the like.

Using RRC signaling, Cell A can configure two intf-RNTIs for UE 1. Each intf-RNTI is tied with a cell ID. In the example, intf-RNTI 1 is tied to cell B and intf-RNTI 2 is tied to cell C. The DCI masked with intf-RNTI 1 can be provided with information about UE 2 or the cell serving UE 2. Likewise, the DCI masked with intf-RNTI 2 can be provided with information about UE 3 or the cell serving UE 3.

As mentioned above, on the eNB side the scheduling information from cells B and C can be routed to cell A. The scheduling information of cells B and C can be broadcasted by cell A on its PDCCH or EPDCCH with intf-RNTI, where intf-RNTI is interference RNTI configured by cell A for interference from cell B/C.

On the UE side, a UE can be configured to monitor DCI(s) transmitted in the common search space/UE specific search space. The DCIs corresponding to a given cell, for example cell A, can be identified in a variety of ways. For example, a UEID range can be divided among the victim UEs' C-RNTIs and intf-RNTIs; and the same search space definition can be used for an intf-RNTI masked DCI follows as for a C-RNTI masked one. The scrambling sequence for an intf-RNTI masked DCI can also be seeded with intf-RNTI itself or a value tied with intf-RNTI. Alternatively, an offset corresponding to the intf-RNTI masked DCI's candidate location(s) can be used in its search space definition.

From the decoded DCIs (masked by intf-RNTI), the UE can identify resource allocation, the virtual cell ID and MCS levels for cell B and cell C. This identified information can be used in advanced UE receivers, for example, in codeword interference cancellation (CWIC) in intercell MU-MIMO setup.

In another approach, intf-RNTI can be used on a new or existing DCI format as explained above, and that DCI format can point to the PDSCH-like resource allocation in the current TTI. Inside the PDSCH-like allocation, the details of scheduling information at one or more interfering cell can be provided.

Figure 4:
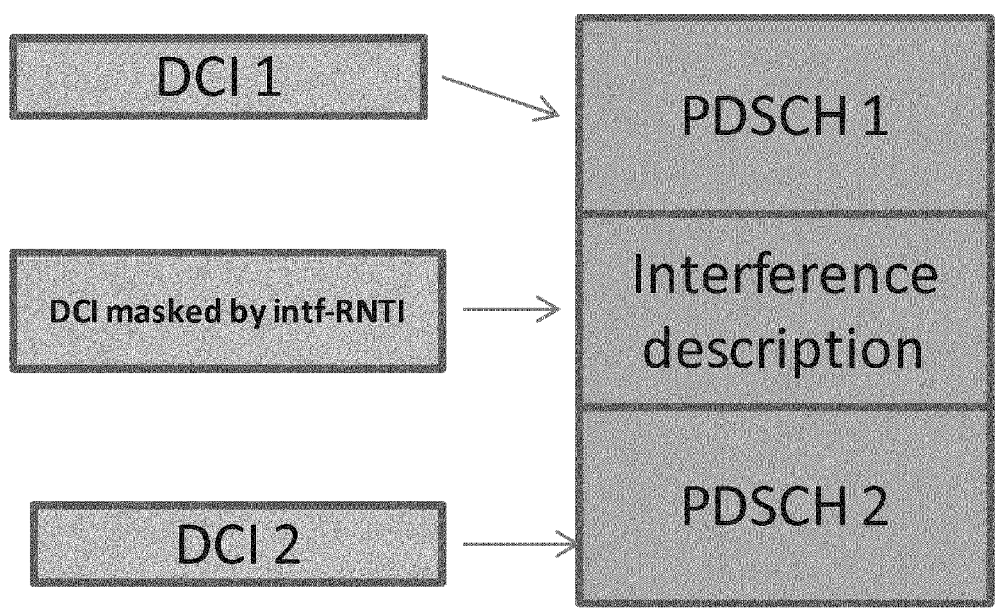
FIG. 4 illustrates PDSCH-like information according to certain embodiments.

FIG. 4 illustrates PDSCH-like information according to certain embodiments. As shown in FIG. 4, DCI 1 can provide PDSCH 1, DCI 2 can provide PDSCH 2, while a DCI masked by an intf-RNTI can provide an interference description.

Some kind of frequency domain ICIC may exist in between cells. In this case, not all the scheduling information from neighbor cells needs to be made available at UEs. If PDSCH transmissions for UE 1 and UE 3 do not overlap, then cell A only transmits intf-RNTI 1 masked DCI to signal interference information.

Opportunistic broadcast of the interference information can be used. For example, in one case the ICIS information is transmitted only when the eNB has the (E)PDCCH capacity to broadcast the ICIS information. Likewise, in an example of opportunistic broadcast, the ICIS information is transmitted in the intf-RNTI pointed DCI(s) can be transmitted only when UEs with ICIS capability are scheduled in the current TTI.

Figure 5:
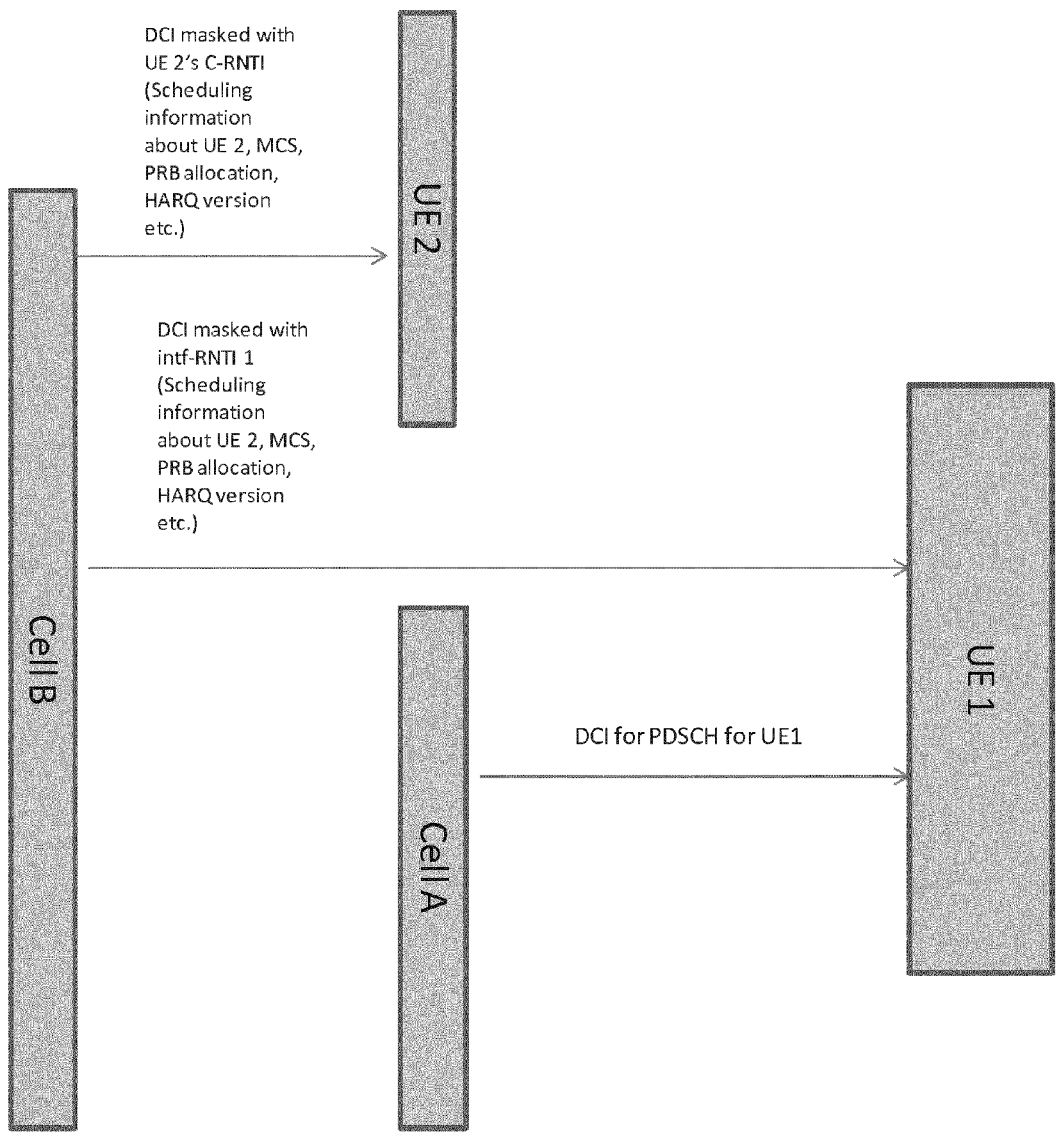
FIG. 5 illustrates UE monitoring of the search spaces of cells A and B, according to certain embodiments.

FIG. 5 illustrates UE monitoring of the search spaces of cells A and B, according to certain embodiments. Almost blank subframes (ABS) was introduced in LTE Rel-10 to partition resources in the time domain between macro and picos/femtos, macro or picos use TDM to share the spectrum resource. As the resource partition is exclusive and the ABS pattern may not be able to be updated at a fast pace, it can result in resource waste if traffic loads at macro and picos change fast. To address this issue, low power almost blank subframes (ABS) was proposed in the LTE Rel-11 time frame to allow a macro eNB to transmit to macro UEs in the nominal ABS subframes with low power, whereby the interference to pico UEs is not severe, and the time-frequency resource in the ABS subframes are not wasted for the macro's point of view. Yet low power ABS is limiting in the sense the macro can only transmits with QPSK during low power ABS subframes, hence it may still not be a fully satisfactory solution. With the given embodiments, the number of ABS subframes may be greatly reduced. As the eICIC framework still offers a way to drive UEs in the CRE region to attach with the pico, it may still be useful. Beyond attaching UEs to the pico, the interference mitigation role may be greatly weakened as explained below.

In one embodiment, the macro just configures one ABS subframe (or subframes corresponding to one HARQ interlace) so the UE measurement procedure in Rel-10 can still function. In all other subframes, including those previously which would be configured as ABS subframes, the macro always transmits towards its UEs. As a consequence, CRE pico UEs may see severe interference from macro. The CRE UE can first read the (E)PDCCH masked by intf-RNTI of the macro to gain scheduling information for macro UEs. Then, based on the scheduling information, the macro PDSCHs can be decoded and remodulated to generate the macro interference signals and the interference at signals at the CRE pico UE can be cancelled.

As shown in FIG. 5, cell A can be a pico cell and UE 1 can be a CRE pico UE. In this case, UE 1 can be signaled through a pico base station about the intf-RNTI. The intf-RNTI can be tied to macro. Cell B can be a macro cell.

UE 1 can monitor Cell B's (E)PDCCH search space according to intf-RNTI and Cell A's (E)PDCCH search space according UE 1's own C-RNTI.

The scheduling information for a macro UE, such as UE 2, can be transmitted with DCI masked by UE 2's C-RNTI by cell B; the scheduling information for UE 2 is also transmitted by Cell B with a DCI masked by intf-RNTI.

UE 1 can decode the transmission intended for UE 2, and can cancel the interference from the received signal to reveal the intended signal for UE 1.

Figure 6:
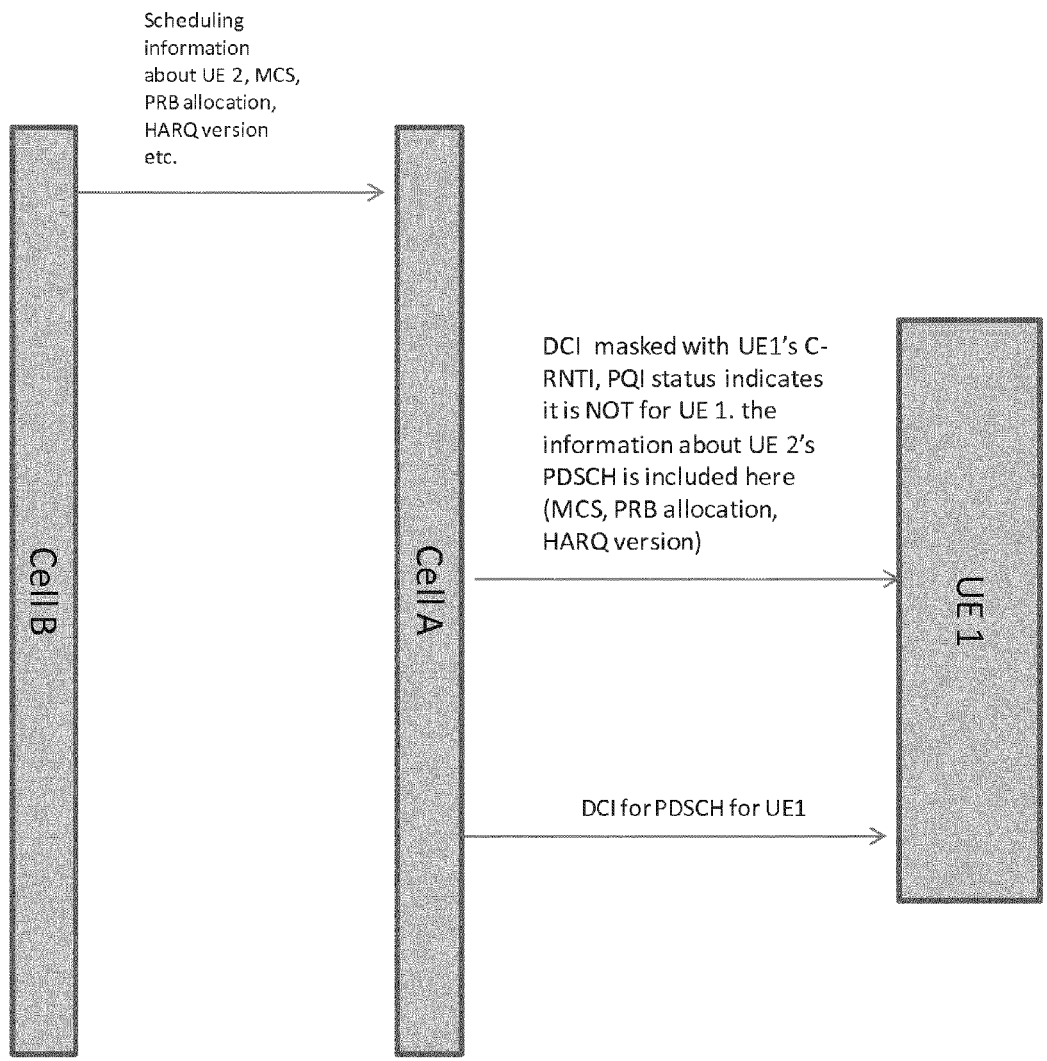
FIG. 6 illustrates UE monitoring of the search space of cell A, according to certain embodiments.

FIG. 6 illustrates UE monitoring of the search space of cell A, according to certain embodiments. The ICIS information can be made available through using a code state in the current DCI format. For example, one code state, or PQI status, in DCI format 2D can be configured with "interference UE scheduling information." Once a UE receives such a PQI status, that UE can assume that the scheduling information is about the interference transmission, not about the transmission intended for itself. The "interference" PQI status can be tied with a virtual cell-ID so the UE receiver can benefit from that information. For example, the DMRS for the interference can be generated and the scrambling mask over the interference signal can be recovered.

Certain embodiments may have various benefits or advantages. For example, certain embodiments may improve overall performance and interference management. Moreover, certain embodiments may configure UE one intf-RNTI that allows the UE to decode in the common search space. Because the DCI size is the same and the search space is fixed, little additional complexity for the blind decoding on the UE side may be needed. As mentioned above, it is also possible to introduce a field in the DCI formats to differentiate between interference transmission and the transmission intended for UE. In this case, the DCI size may be the same and the search space may be fixed for both interference information and PDSCH scheduling information for the UE. Thus, little additional complexity for the blind decoding on the UE side may be needed.

Figure 7:
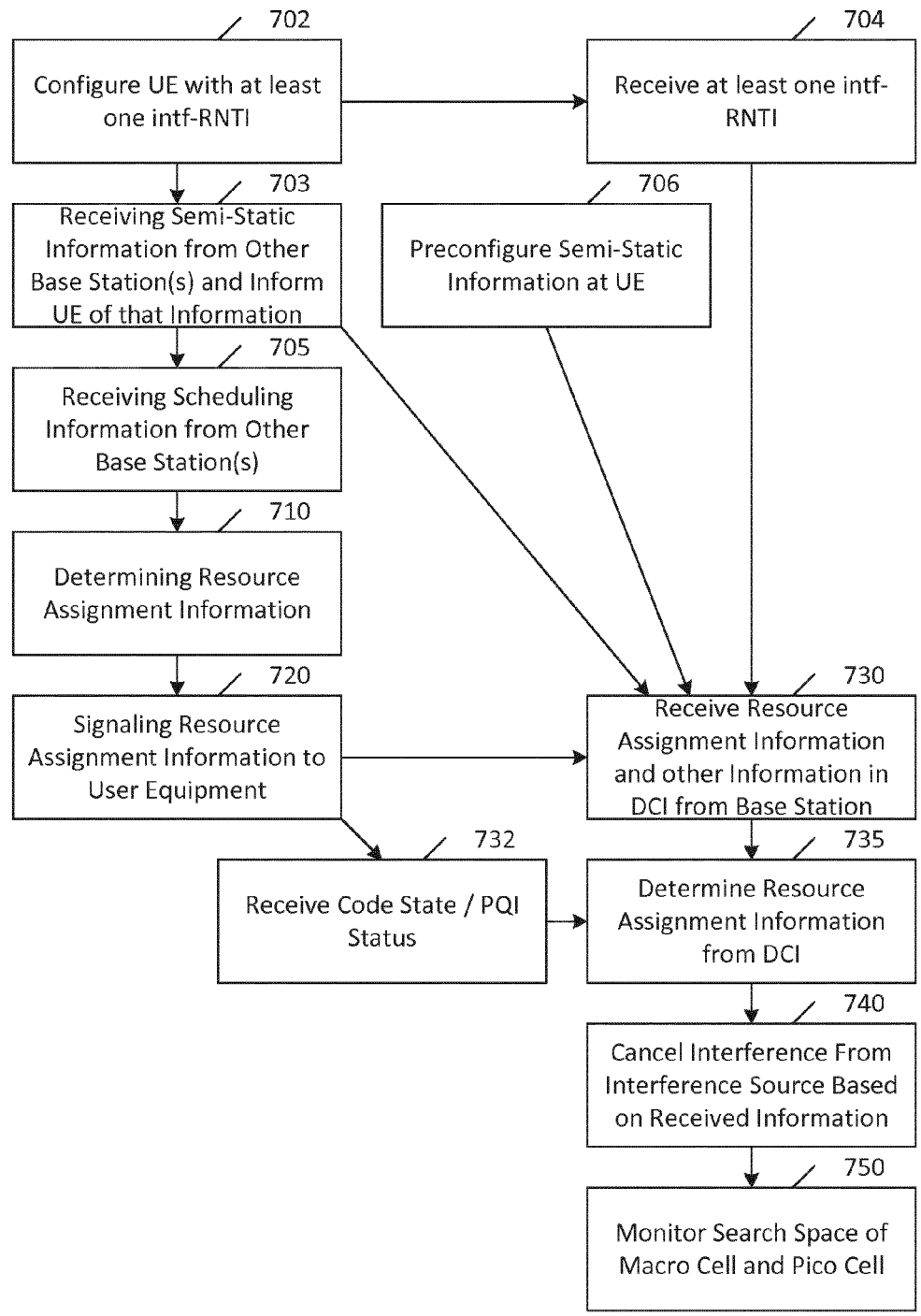
FIG. 7 illustrates a method according to certain embodiments.

FIG. 7 illustrates a method according to certain embodiments. As shown in FIG. 7, at 703 the method can include receiving from other base station(s) semi-static information and inform a UE with that. At 702, a UE can be configured with at least one interference ID (intf-RNTI). The method can also include, at 710, determining resource assignment information, optionally MCS level or modulation order, HARQ revision, number of spatial layers, and number of transport blocks, for at least one interference source for a user equipment of a base station. The method can also include, at 720, signaling the user equipment about the resource assignment information for the at least one interference source. The resource assignment information is configured to facilitate a receiver of the user equipment to cancel interference from the at least one interference source.

The signaling can include masking downlink control information with an interference radio network temporary identity. More particularly, the signaling can include masking each of a plurality of downlink control information with a corresponding interference radio network temporary identity. In other words, each masked DCI can correspond to a different intf-RNTI.

The determining can include receiving the resource assignment information from at least one other base station, wherein the at least one interference source can include the at least one other base station.

The signaling can include signaling an interference radio network temporary identity, wherein the interference radio network temporary identity is uniquely associated with a cell. More particularly, the signaling can include signaling a plurality of interference radio network temporary identities, wherein each interference radio network temporary identity of the plurality of interference radio network temporary identities is uniquely associated with a corresponding cell.

The signaling can include signaling to a user equipment of a pico cell regarding resource assignment of a macro cell.

The signaling can include a code state, wherein the code state is configured to indicate that corresponding scheduling information is about an interference transmission rather than about the base station. The code state can include a PDSCH RE mapping and Quasi-Collocation Indicator status.

The method can also include, at 730, receiving resource assignment information and other information contained in downlink control information for at least one interference source for a user equipment of a base station. The downlink control information for at least one interference source can be masked by at least one interference ID. The method can also include, at 740, canceling, at the user equipment, interference from the at least one interference source based on the received resource assignment information.

The method can include, at 735, determining the resource assignment information from downlink control information masked with an interference radio network temporary identity. More particularly, the method can include determining that the downlink control information belongs to a specific cell based on at least one of a user equipment identification range or an offset corresponding to a location of the downlink control information.

The canceling the interference can include decoding a transmission intended for a second user equipment and canceling interference from the received signal, wherein the canceling is configured to reveal a signal intended for the user equipment.

The method can include, at 750, monitoring a search space of a macro cell according to an interference radio network temporary identity and a search space of a pico cell according to a cell radio network temporary identity of the base station. This is illustrated, for example, in FIG. 5.

As shown in FIG. 7, the method can include, at 732, receiving a code state with the resource assignment information, and interpreting corresponding scheduling information as being about an interference transmission rather than about the base station, based on the code state. The code state can include a PDSCH RE mapping and Quasi-Collocation Indicator status.

The method can also include, at 706, preconfiguring the user equipment with semi-static information. The semi-static information can correspond to some or all of the relatively unchanging information described above.

Moreover, the user equipment can further receive dynamic information routed from an interference cell or directly broadcasted from the interference cell and can use the dynamic information together with the semi-static information to cancel the interference at 740. The dynamic information can be some or all of the relatively changing information, described above.

Figure 8:
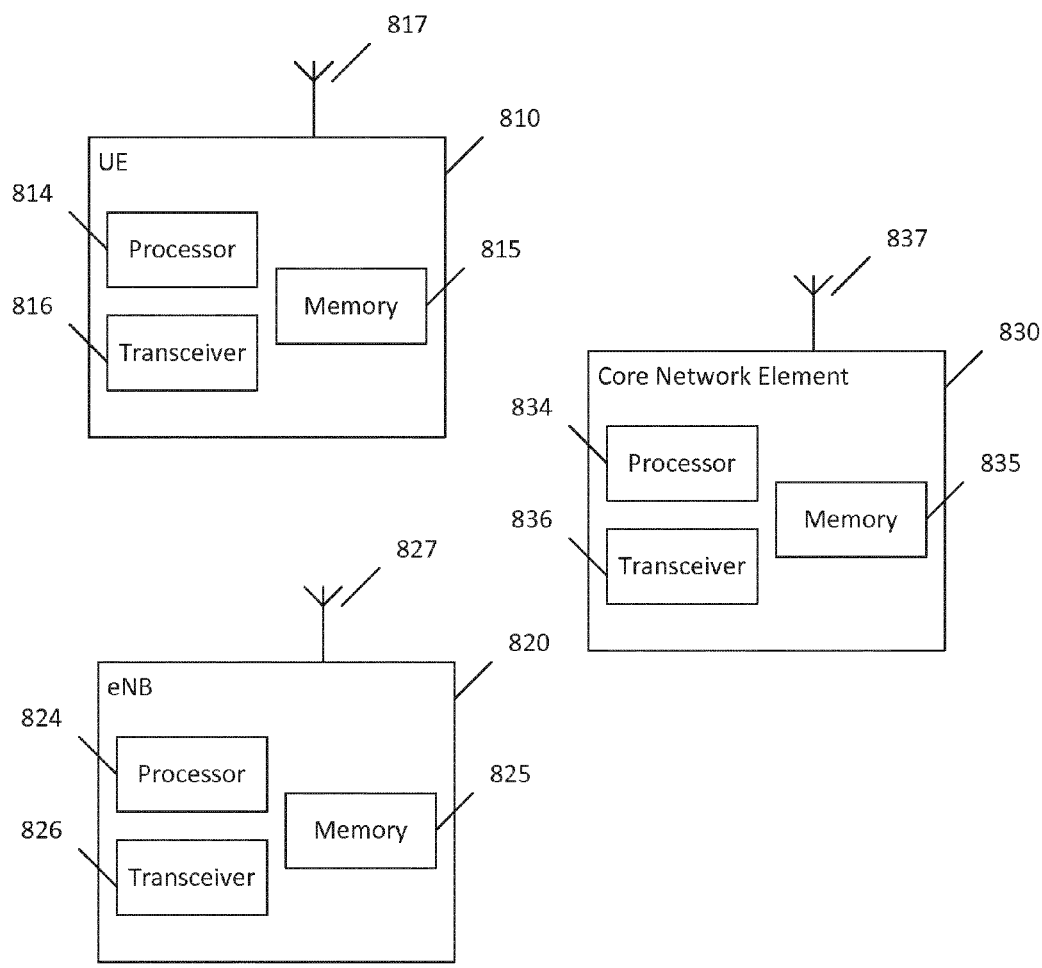
FIG. 8 illustrates a system according to certain embodiments.

FIG. 8 illustrates a system according to certain embodiments of the invention. In one embodiment, a system may include multiple devices, such as, for example, at least one UE 810, at least one first eNB 820 or other base station or access point, and at least one second eNB 830. In certain systems, UE 810, first eNB 820, second eNB 830, and a plurality of other user equipment may be present. Other configurations are also possible. The first eNB 820 may be, for example, a macro eNB and the second eNB 830 may be, for example, a pico eNB.

Each of these devices may include at least one processor, respectively indicated as 814, 824, and 834. At least one memory can be provided in each device, as indicated at 815, 825, and 835, respectively. The memory may include computer program instructions or computer code contained therein. The processors 814, 824, and 834 and memories 815, 825, and 835, or a subset thereof, can be configured to provide means corresponding to the various blocks of FIG. 7. Although not shown, the devices may also include positioning hardware, such as global positioning system (GPS) or micro electrical mechanical system (MEMS) hardware, which can be used to determine a location of the device. Other sensors are also permitted and can be included to determine location, elevation, orientation, and so forth, such as barometers, compasses, and the like.

As shown in FIG. 8, transceivers 816, 826, and 836 can be provided, and each device may also include at least one antenna, respectively illustrated as 817, 827, and 837. The device may have many antennas, such as an array of antennas configured for multiple input multiple output (MIMO) communications, or multiple antennas for multiple radio access technologies. Other configurations of these devices, for example, may be provided. For example, first eNB 820 and second eNB 830 may additionally be configured for wired communication, and in such a case antenna 837 would also illustrate any form of communication hardware, without requiring a conventional antenna.

Transceivers 816, 826, and 836 can each, independently, be a transmitter, a receiver, or both a transmitter and a receiver, or a unit or device that is configured both for transmission and reception.

Processors 814, 824, and 834 can be embodied by any computational or data processing device, such as a central processing unit (CPU), application specific integrated circuit (ASIC), or comparable device. The processors can be implemented as a single controller, or a plurality of controllers or processors.

Memories 815, 825, and 835 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as UE 810, first eNB 820, and second eNB 830, to perform any of the processes described above (see, for example, FIGS. 2 through 7). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 8 illustrates a system including a UE, first eNB, and second eNB, embodiments of the invention may be applicable to other configurations, and configurations involving additional elements.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

Glossary

3GPP third generation partnership project
ASIC application specific integrated circuit
CPU central processing unit
DAI Downlink Assignment Index, a field present in some DCIs in DD
DCI downlink control information
eNB evolved Node B
EPDCCH Enhanced PDCCH
HDD hard disk drive
ICIS interference suppression and interference cancellation
IMIC or MIC interference mitigation and interference cancellation/suppression
ISIC interference suppression and interference cancellation
NAICS network assisted interference cancellation and suppression
NDI New data indicator, a field in some DCI formats
PDSCH physical downlink shared channel
PRB physical resource block
PMI pre-coding matrix indicator
PQI PDSCH RE mapping and Quasi-Collocation Indicator, a field in DCI format 2D
RAM random access memory RRC radio resource control
RNTI radio network temporary identity
TPC Transmit Power Control for PUCCH, a field in some DCI formats
TTI transmission time interval
SRS request a field present in some DCIs in TDD
UE user equipment
VRB Virtual Resource Block

We claim:

1. A method, comprising:
   determining transmission information for at least one interference source for a user equipment of a base station; and
   signaling the user equipment about the transmission information for the at least one interference source, wherein the transmission information is configured to facilitate a receiver of the user equipment to cancel interference from the at least one interference source;
   wherein the signaling comprises masking each of a plurality of downlink control information with a corresponding interference radio network temporary identity.

2. The method of claim 1, wherein the determining comprises receiving the transmission information from at least one other base station, wherein the at least one interference source comprises the at least one other base station.

3. The method of claim 1, wherein the signaling comprises signaling an interference radio network temporary identity, wherein the interference radio network temporary identity is uniquely associated with a cell.

4. A method, comprising:
   determining transmission information for at least one interference source for a user equipment of a base station; and
   signaling the user equipment about the transmission information for the at least one interference source, wherein the transmission information is configured to facilitate a receiver of the user equipment to cancel interference from the at least one interference source;
   wherein the signaling comprises signaling a plurality of interference radio network temporary identities, wherein each interference radio network temporary identity of the plurality of interference radio network temporary identities is uniquely associated with a corresponding cell.

5. A method, comprising:
   determining transmission information for at least one interference source for a user equipment of a base station; and
   signaling the user equipment about the transmission information for the at least one interference source, wherein the transmission information is configured to facilitate a receiver of the user equipment to cancel interference from the at least one interference source;
   wherein the signaling comprises a code state, wherein the code state is configured to indicate that corresponding scheduling information is about an interference transmission rather than about the base station.

6. An apparatus, comprising:
   at least one processor; and
   at least one memory including computer program code,
   wherein the at least one memory and the computer program code are configured, with the at least one processor, to cause the apparatus at least to:
   determine transmission information for at least one interference source for a user equipment of a base station; and
   signal the user equipment about the transmission information for the at least one interference source, wherein the transmission information is configured to facilitate a receiver of the user equipment to cancel interference from the at least one interference source;
   wherein the signaling comprises masking each of a plurality of downlink control information with a corresponding interference radio network temporary identity.

7. The apparatus of claim 6, wherein the determining comprises receiving the transmission information from at least one other base station, wherein the at least one interference source comprises the at least one other base station.

8. The apparatus of claim 6, wherein the signaling comprises signaling an interference radio network temporary identity, wherein the interference radio network temporary identity is uniquely associated with a cell.

9. An apparatus, comprising:
   at least one processor; and
   at least one memory including computer program code,
   wherein the at least one memory and the computer program code are configured, with the at least one processor, to cause the apparatus at least to:
   determine transmission information for at least one interference source for a user equipment of a base station; and
   signal the user equipment about the transmission information for the at least one interference source, wherein the transmission information is configured to facilitate a receiver of the user equipment to cancel interference from the at least one interference source;
   wherein the signaling comprises signaling a plurality of interference radio network temporary identities, wherein each interference radio network temporary identity of the plurality of interference radio network temporary identities is uniquely associated with a corresponding cell.

10. An apparatus, comprising:
    at least one processor; and
    at least one memory including computer program code,
    wherein the at least one memory and the computer program code are configured, with the at least one processor, to cause the apparatus at least to:
    receive transmission information for at least one interference source for a user equipment of a base station; and
    cancel, at the user equipment, interference from the at least one interference source based on the received transmission information
    wherein the at least one memory and the computer program code are configured, with the at least one processor, to cause the apparatus at least to:
    determine the transmission information from downlink control information masked with an interference radio network temporary identity.

11. The apparatus of claim 10, wherein the at least one memory and the computer program code are configured, with the at least one processor, to cause the apparatus at least to:
    determine that the downlink control information belongs to a specific cell based on at least one of a user equipment identification range or an offset corresponding to a location of the downlink control information.

12. The apparatus of claim 10, wherein the at least one memory and the computer program code are configured, with the at least one processor, to cause the apparatus at least to:

decode a transmission intended for a second user equipment and canceling interference from the received signal, wherein the canceling is configured to reveal a signal intended for the user equipment.

13. The method of claim 1, wherein the signaling comprises masking downlink control information with an interference radio network temporary identity.

14. The apparatus of claim 6, wherein the signaling comprises masking downlink control information with an interference radio network temporary identity.

* * * * *